(12) United States Patent
Choi et al.

(10) Patent No.: US 12,451,204 B2
(45) Date of Patent: Oct. 21, 2025

(54) MEMORY DEVICE SUPPORTING WORD LINE HOLDING OPERATION AND OPERATING METHOD OF THE SAME

(71) Applicant: SK hynix Inc., Gyeonggi-do (KR)

(72) Inventors: Hyung Jin Choi, Gyeonggi-do (KR); Se Chun Park, Gyeonggi-do (KR); In Gon Yang, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 182 days.

(21) Appl. No.: 18/534,731

(22) Filed: Dec. 11, 2023

(65) Prior Publication Data
US 2025/0037776 A1 Jan. 30, 2025

(30) Foreign Application Priority Data
Jul. 27, 2023 (KR) .................. 10-2023-0097993

(51) Int. Cl.
| | | |
|---|---|---|
| G11C 8/08 | (2006.01) | |
| G11C 8/14 | (2006.01) | |
| G11C 16/08 | (2006.01) | |
| G11C 16/10 | (2006.01) | |
| G11C 16/34 | (2006.01) | |

(52) U.S. Cl.
CPC .......... G11C 16/3459 (2013.01); G11C 16/08 (2013.01); G11C 16/102 (2013.01)

(58) Field of Classification Search
CPC ... G11C 16/3459; G11C 16/08; G11C 16/102; G11C 11/5628; G11C 16/0483; G11C 16/10; G11C 16/24; G11C 8/08; G11C 8/14; G11C 16/14
See application file for complete search history.

(56) References Cited

U.S. PATENT DOCUMENTS

| | | | |
|---|---|---|---|
| 7,606,079 B2 | 10/2009 | Sekar et al. | |
| 2007/0211536 A1* | 9/2007 | Aritome ............. | G11C 16/3454 |
| | | | 365/185.22 |
| 2014/0160856 A1* | 6/2014 | Joo ........................ | G11C 16/10 |
| | | | 365/185.22 |
| 2015/0071008 A1* | 3/2015 | Yang .................. | G11C 16/0483 |
| | | | 365/185.23 |
| 2020/0118630 A1* | 4/2020 | Lin ........................ | G11C 16/08 |
| 2023/0113235 A1* | 4/2023 | Jeong .................... | G11C 16/24 |
| | | | 365/185.11 |

* cited by examiner

*Primary Examiner* — Hien N Nguyen
(74) *Attorney, Agent, or Firm* — IP & T GROUP LLP

(57) ABSTRACT

A memory device including: a memory device may include: a memory cell array, and a controller configured to perform program loops each comprising a voltage application operation, a word line holding operation, and a verification operation until a program operation for selected memory cells is successful, during the word line holding operation, apply a holding pass voltage having a higher level than a ground voltage to each of first word lines having a program state and second word lines having an erase state, which belong to unselected word lines among a plurality of word lines, during the verification operation, apply a verification pass voltage having a higher level than the holding pass voltage to K word lines that belong to the first word lines and the second word lines, and apply the holding pass voltage to remaining word lines except the K word lines, among the second word lines.

10 Claims, 7 Drawing Sheets

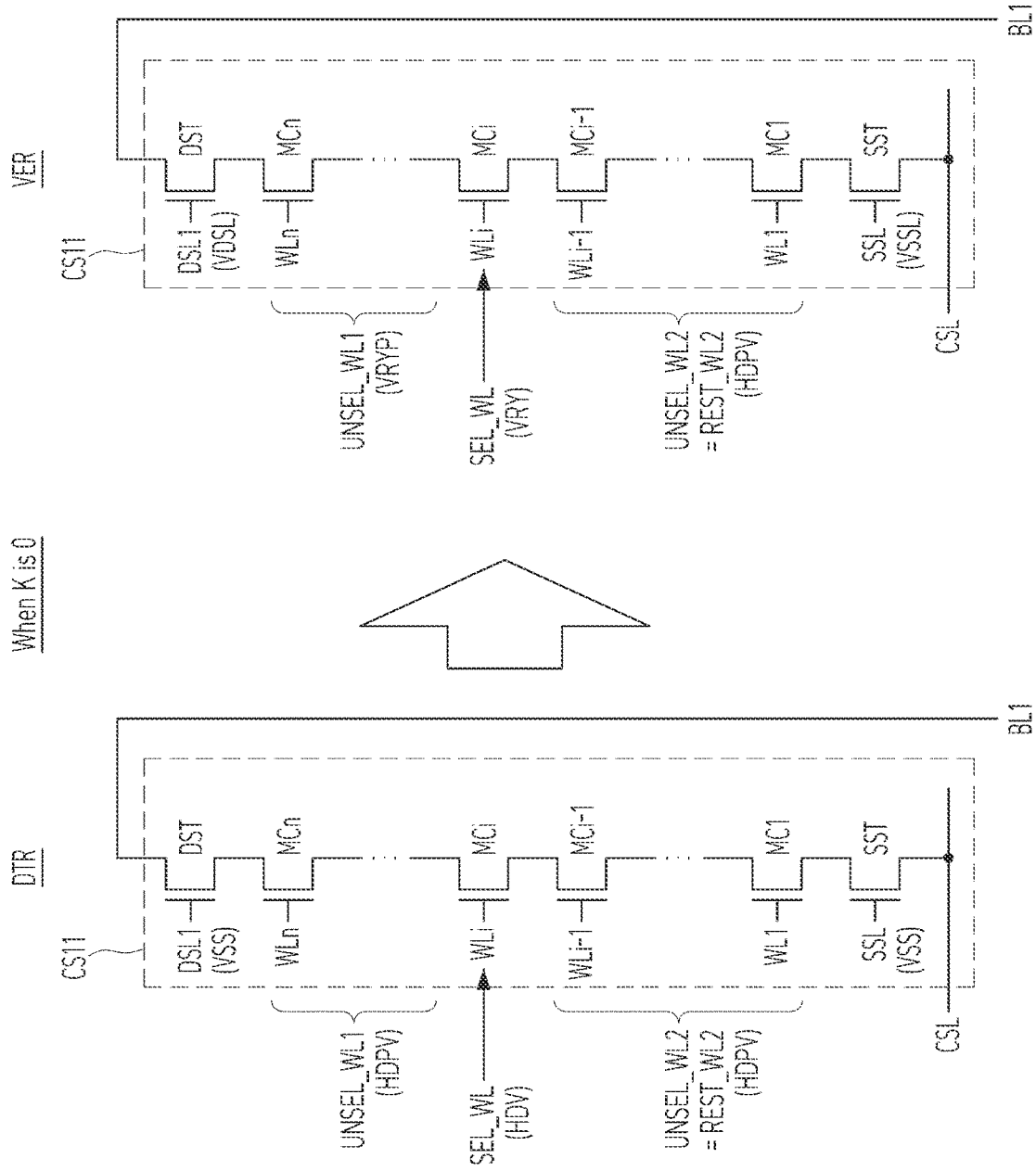

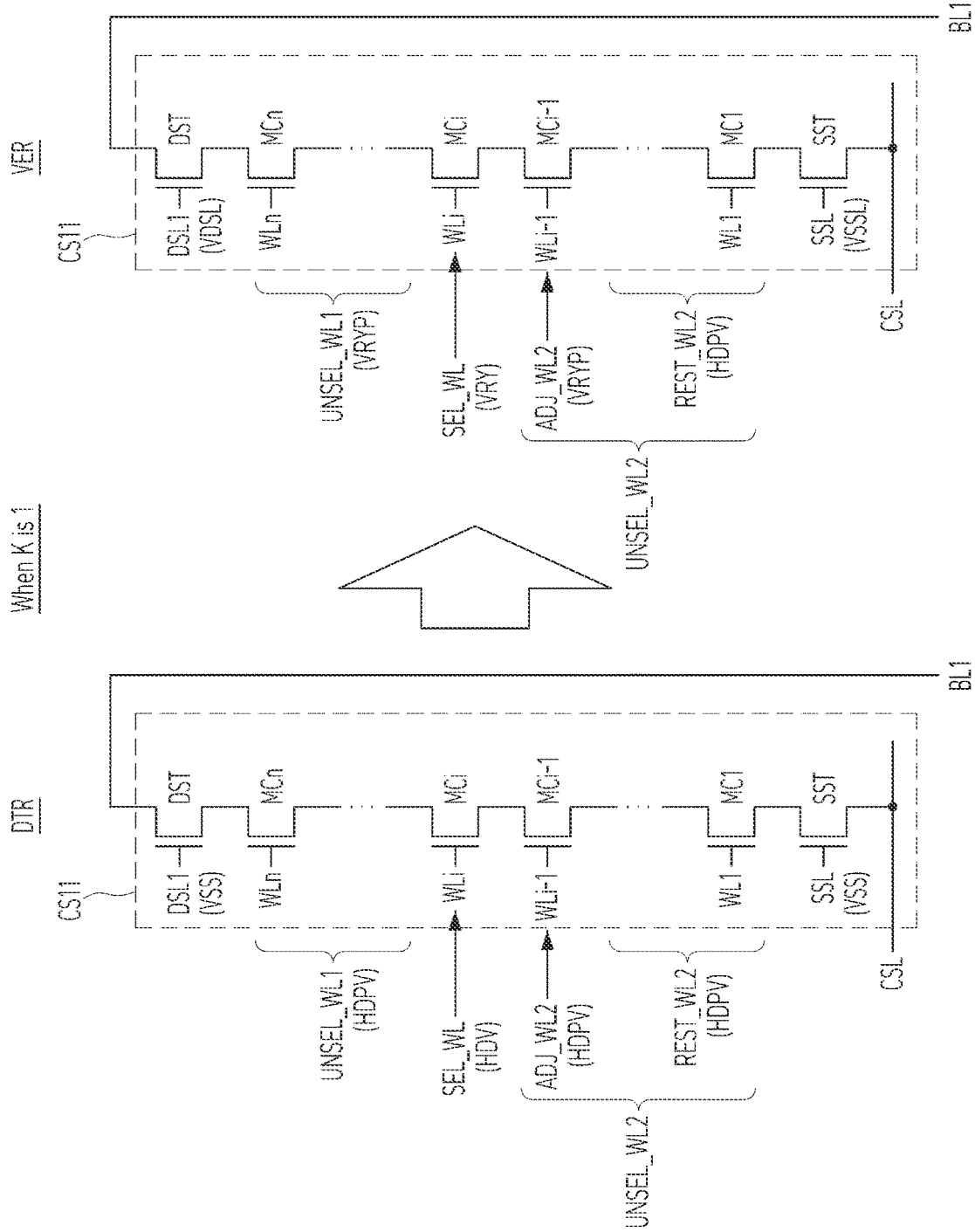

MEMORY DEVICE SUPPORTING WORD LINE HOLDING OPERATION AND OPERATING METHOD OF THE SAME

CROSS-REFERENCE TO RELATED APPLICATION

This application claims priority under 35 U.S.C. § 119 to Korean Patent Application No. 10-2023-0097993 filed on Jul. 27, 2023, which is incorporated herein by reference in its entirety.

BACKGROUND

1. Field

Embodiments relate to a memory device, and more particularly, to a memory device supporting a word line holding operation and an operating method of the same.

2. Discussion of the Related Art

Memory systems are storage devices embodied using a semiconductor such as silicon (Si), germanium (Ge), gallium arsenide (GaAs), indium phosphide (InP), or the like. The memory systems may be a volatile memory device or a nonvolatile memory device. The volatile memory device is a memory device in which data stored therein is lost when its power supply is interrupted. Representative examples of the volatile memory device include a static RAM (SRAM), a dynamic RAM (DRAM), a synchronous DRAM (SDRAM), etc. The nonvolatile memory device is a memory device in which data stored therein is retained even when its power supply is interrupted. Representative examples of the nonvolatile memory device include a read only memory (ROM), a programmable ROM (PROM), an electrically programmable ROM (EPROM), an electrically erasable programmable ROM (EEPROM), a flash memory, a phase-change random access memory (PRAM), a magnetic RAM (MRAM), a resistive RAM (RRAM), a ferroelectric RAM (FRAM), etc. Flash memories may be a NOR-type flash memory or a NAND-type flash memory.

A cell of a nonvolatile memory device is an element on which an electrical program/erase operation may be performed. The nonvolatile memory device may perform program and erase operations on the cell by changing the threshold voltage of the cell as electrons are moved by a strong electric field applied to a thin oxide film of the cell.

A program operation for a plurality of memory cells that are included in a nonvolatile memory device may be performed by an incremental step pulse program (ISPP) algorithm for changing the threshold voltages of memory cells selected as a program target, while applying a program pulse, having a voltage increased step by step, to a word line to which the memory cells selected as the program target have been connected. Furthermore, after the program pulse is applied, a verification operation of checking whether threshold voltage levels of the memory cells selected as the program target have reached a target voltage level, may be performed. In this case, the verification operation may be repeated along with the voltage application operation by an ISPP algorithm.

Furthermore, in the voltage application operation, a difference between the potential level of a program voltage that is applied to a word line selected as a program target and the potential level of a program pass voltage that is applied to a word line not selected as a program target may be very great. Accordingly, even after timing at which the voltage application operation has been completed, the potential level of the word line selected as the program target and the potential level of the word line not selected as the program target may be in the state in which the potential levels have some degree of difference. There may be a good possibility that an error will occur in a verification operation that is performed in such a state.

SUMMARY

Various embodiments of the present disclosure are directed to providing a memory device and an operating method of the same, which can perform a program operation through the repetition of a program loop in which a word line holding operation is added between a voltage application operation and a verification operation.

Furthermore, an embodiment of the present disclosure may provide a memory device capable of adjusting the level of a voltage that is applied to a word line not selected as a program target between a word line holding operation and a verification operation that are included in a program loop based on a state (i.e., whether the unselected word line is physically adjacent to a program or erased/selected word line) of the word line not selected as the program target and an operating method of the memory device.

The problems to be solved by the present disclosure are not limited to the above-mentioned problems, and the other unmentioned problems will be clearly understood from the following description by those skilled in the art.

In an aspect of an embodiment in the present disclosure, a memory device may include: a memory cell array comprising a plurality of cell strings that are connected between a plurality of bit lines and a common source line and a plurality of word lines that are connected to the plurality of cell strings; and a controller configured to perform program loops each comprising a voltage application operation, a word line holding operation, and a verification operation until a program operation for selected memory cells corresponding to a selected word line and a selected cell string is successful, during the word line holding operation, apply a holding pass voltage having a higher level than a ground voltage to each of first word lines having a program state and second word lines having an erase state, which belong to unselected word lines among the plurality of word lines, during the verification operation, apply a verification pass voltage having a higher level than the holding pass voltage to K word lines that belong to the first word lines and the second word lines, and apply the holding pass voltage to remaining word lines except the K word lines, among the second word lines, wherein K may be an integer equal to or greater than 0.

In an aspect of an embodiment in the present disclosure, an operating method of a memory device comprising a plurality of cell strings that are connected between a plurality of bit lines and a common source line and a plurality of word lines that are connected to the plurality of cell strings, the operating method may include: performing program loops each comprising a voltage application operation, a word line holding operation, and a verification operation until a program operation for selected memory cells corresponding to a selected word line and a selected cell string is successful; classifying the plurality of word lines into the selected word line and an unselected word line and classifying the unselected word line into first word lines having a program state and second words line having an erase state; during the word line holding operation, applying a holding pass voltage to each of the first and second word lines and applying a holding voltage having a level higher than or equal to the holding pass voltage to the selected word line; and during the verification operation, applying a verification voltage to the selected word line, applying a verification pass voltage having a level higher than the holding pass voltage to the K word lines that belong to the first word lines and the second word lines, and applying the holding pass voltage to remaining word lines except the K word lines, among the second word lines, wherein K may be an integer equal to or greater than 0.

According to the present technology, when a program operation is performed on memory cells that are connected to a word line selected as a program target through the repetition of a voltage application operation, a holding operation, and a verification operation, the level of a voltage that is applied to a word line not selected as a program target can be adjusted between the holding operation and the verification operation depending on a state (i.e., whether the unselected word line is physically adjacent to a program or erased/selected word line) of the unselected word line.

Accordingly, power unnecessarily consumed can be reduced by optimizing a change in the level of the voltage applied to the word line that is not selected as a program target in a process of executing the holding operation.

BRIEF DESCRIPTION OF THE DRAWINGS

FIGS. 4A to 4C are diagrams for describing a program loop that is included in a program operation of the memory device disclosed in FIGS. 1 and 2 according to an embodiment of the present disclosure.

DETAILED DESCRIPTION

Figure 1:
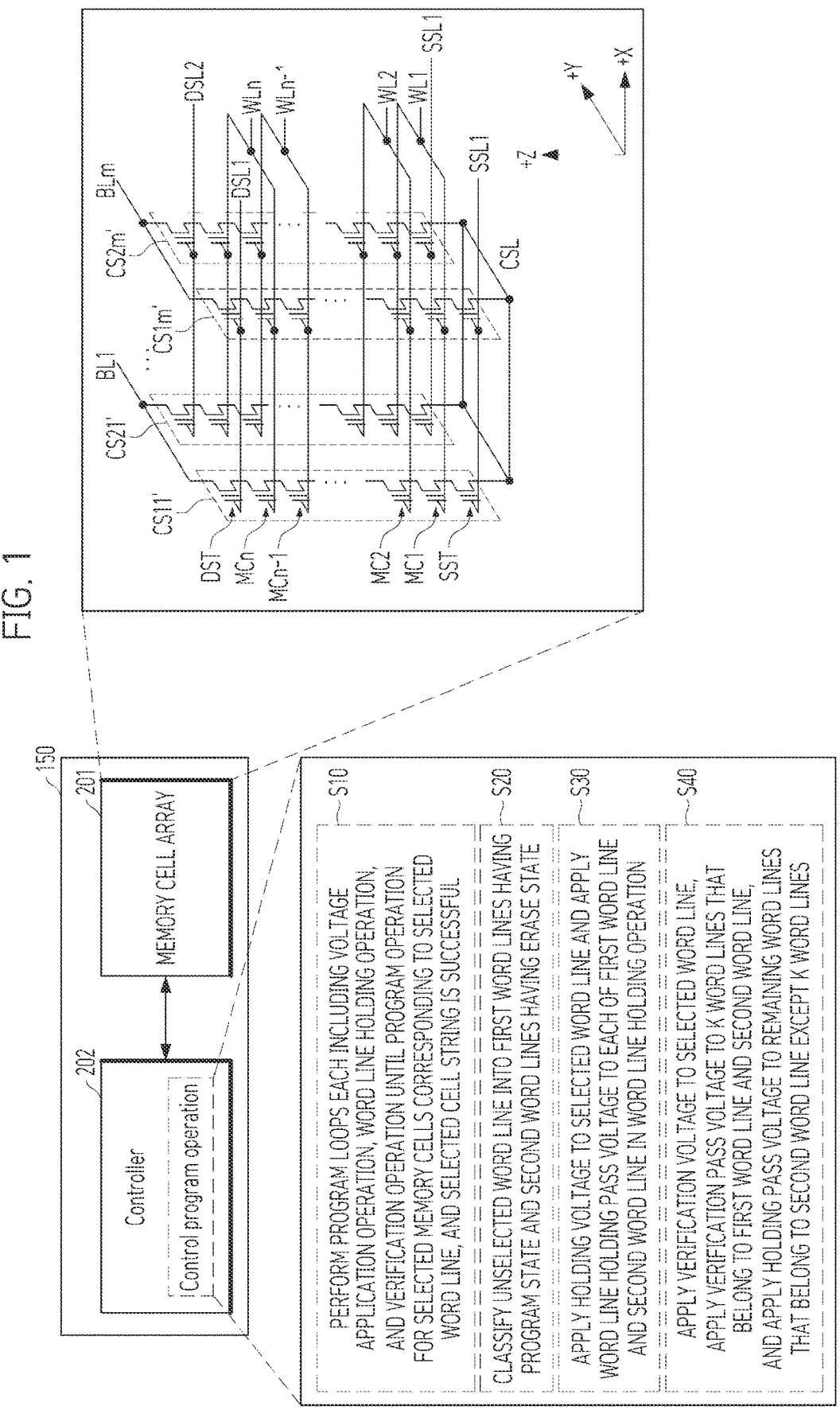
FIG. 1 is a diagram for describing a memory device according to an embodiment of the present disclosure.

Various embodiments of the present disclosure are described below with reference to the accompanying drawings. Elements and features of the present disclosure, however, may be configured or arranged differently to form other embodiments, which may be variations of any of the disclosed embodiments.

In this disclosure, references to various features (e.g., elements, structures, modules, components, steps, operations, characteristics, etc.) included in "one embodiment," "example embodiment," "an embodiment," "another embodiment," "some embodiments," "various embodiments," "other embodiments," "alternative embodiment," and the like are intended to mean that any such features are included in one or more embodiments of the present disclosure, but may or may not necessarily be combined in the same embodiments.

In this disclosure, the terms "comprise," "comprising," "include," and "including" are open-ended. As used in the appended claims, these terms specify the presence of the stated elements and do not preclude the presence or addition of one or more other elements. The terms in a claim do not foreclose the apparatus from including additional components (e.g., an interface unit, circuitry, etc.).

In this disclosure, various units, circuits, or other components may be described or claimed as "configured to" perform a task or tasks. In such contexts, "configured to" is used to connote structure by indicating that the blocks/units/circuits/components include structure (e.g., circuitry) that performs one or more tasks during operation. As such, the block/unit/circuit/component can be said to be configured to perform the task even when the specified block/unit/circuit/component is not currently operational (e.g., is not turned on nor activated). The block/unit/circuit/component used with the "configured to" language includes hardware—for example, circuits, memory storing program instructions executable to implement the operation, etc. Additionally, "configured to" can include a generic structure (e.g., generic circuitry) that is manipulated by software and/or firmware (e.g., an FPGA or a general-purpose processor executing software) to operate in a manner that is capable of performing the task(s) at issue. "Configured to" may also include adapting a manufacturing process (e.g., a semiconductor fabrication facility) to fabricate devices (e.g., integrated circuits) that implement or perform one or more tasks.

As used in the present disclosure, the term 'circuitry' or 'logic' refers to all of the following: (a) hardware-only circuit implementations (such as implementations in only analog and/or digital circuitry) and (b) combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions and (c) circuits, such as a microprocessor(s) or a portion of a microprocessor(s), that require software or firmware for operation, even if the software or firmware is not physically present. This definition of 'circuitry' or 'logic' applies to all uses of this term in this application, including in any claims. As a further example, as used in this application, the term "circuitry" or "logic" also covers an implementation of merely a processor (or multiple processors) or a portion of a processor and its (or their) accompanying software and/or firmware. The term "circuitry" or "logic" also covers, for example, and if applicable to a particular claim element, an integrated circuit for a storage device.

As used herein, the terms "first," "second," "third," and so on are used as labels for nouns that the terms precede, and do not imply any type of ordering (e.g., spatial, temporal, logical, etc.). The terms "first" and "second" do not necessarily imply that the first value must be written before the second value. Further, although the terms may be used herein to identify various elements, these elements are not limited by these terms. These terms are used to distinguish one element from another element that otherwise have the same or similar names. For example, a first circuitry may be distinguished from a second circuitry.

Further, the term "based on" is used to describe one or more factors that affect a determination. This term does not foreclose additional factors that may affect a determination. That is, a determination may be solely based on those factors or based, at least in part, on those factors. For example, the phrase "determine A based on B." While in this case, B is a factor that affects the determination of A, such a phrase does not foreclose the determination of A from also being based on C. In other instances, A may be determined based solely on B.

Herein, an item of data, a data item, a data entry or an entry of data may be a sequence of bits. For example, the data item may include the contents of a file, a portion of the file, a page in memory, an object in an object-oriented program, a digital message, a digital scanned image, a part of a video or audio signal, metadata or any other entity which can be represented by a sequence of bits. According to an embodiment, the data item may include a discrete object. According to another embodiment, the data item may include a unit of information within a transmission packet between two different components.

FIG. 1 is a diagram for describing a memory device 150 according to an embodiment of the present disclosure.

Figure 2:
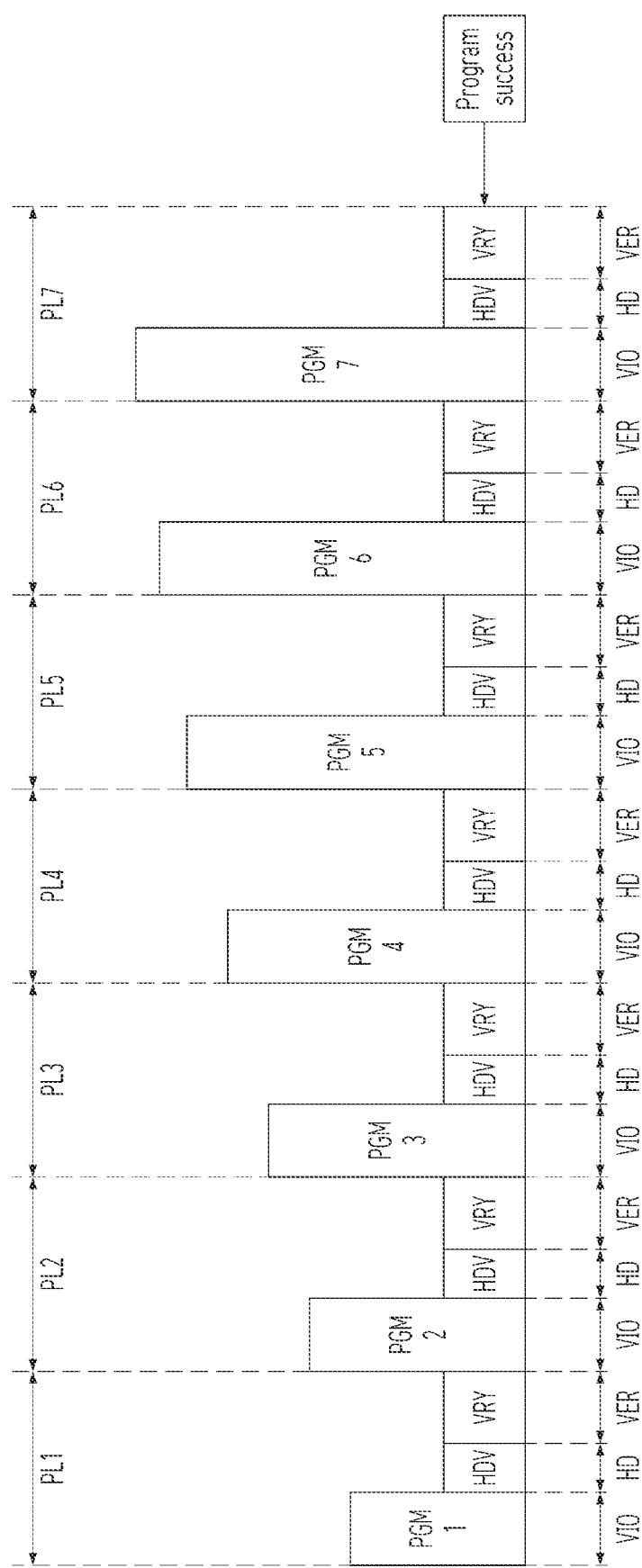
FIG. 2 is a diagram for describing a program operation of the memory device disclosed in FIG. 1 according to an embodiment of the present disclosure.

FIG. 2 is a diagram for describing a program operation of the memory device 150 disclosed in FIG. 1 according to an embodiment of the present disclosure.

Referring to FIG. 1, the memory device 150 may include a memory cell array 201 and a controller 202.

The memory cell array 201 may include a plurality of memory blocks. Further, each of the memory blocks may include a plurality of pages each including a plurality of a plurality of memory cells.

The memory blocks may be understood as a group of non-volatile memory cells from which data are removed together through the erase operation. Each of the memory blocks may include a page in which the non-volatile memory cells are grouped, from a logical point of view, such as storing of data together during the program operation or outputting of data together during the read operation. For example, one memory block may include a plurality of pages. One page may include a plurality of non-volatile memory cells.

From a physical point of view different from the logical point of view such as the program operation or the read operation, one memory block may include a plurality of word lines. One word line may include a plurality of non-volatile memory cells.

In this case, one word line may correspond to at least one page according to the number of bits that can be stored or expressed in one non-volatile memory cell. For example, when one non-volatile memory cell is a single level cell (SLC) storing one data bit, one word line may correspond to one page. When one non-volatile memory cell is a double level cell (DLC) storing two data bits, one word line may correspond to two pages. When one non-volatile memory cell is a triple level cell (TLC) storing three data bits, one word line may correspond to three pages. When one non-volatile memory cell is a quadruple level cell (QLC) storing four data bits, one word line may correspond to four pages. In this way, when one non-volatile memory cell is a multiple level cell storing five or more data bits, one word line may correspond to five or more pages.

More specifically, each of the memory blocks may include a 3-D structure. For example, each of the memory blocks may include a plurality of memory cells that are stacked on a substrate. Accordingly, each of the memory blocks may be arranged in a +X direction, a +Y direction, and a +Z direction.

That is, each of the memory blocks may include a plurality of memory cells that are connected among a plurality of word lines WL<1:n> that are arranged in a Z direction, a plurality of bit lines BL<1:m> that are arranged in an X direction, and a plurality of cell strings CS<1:2> <1:m> that are arranged in a Y direction.

Herein, each of the cell strings CS<1:2> <1:m> may include at least one source selection transistor SST and first to nth memory cells MC<1:n> and at least one drain selection transistor DST.

Herein, each of the selection transistors SST and DST and the memory cells MC<1:n> may have a similar structure. According to an embodiment of the present disclosure, each of the selection transistor SST and DST and the memory cells MC<1:n> may include a channel layer, a tunneling dielectric layer, a charge storage layer, and a blocking dielectric layer. According to another embodiment of the present disclosure, a pillar for providing a channel layer may be provided in each cell string. According to yet another embodiment of the present disclosure, a pillar for providing at least one of a channel layer, a tunneling dielectric layer, a charge storage layer, and a blocking dielectric layer may be provided to each cell string.

The source selection transistor SST included in each of the cell strings CS<1:2> <1:m> may be coupled between a common source line CSL and a memory cell MC<1:n>.

According to an embodiment of the present disclosure, source selection transistors of the cell strings that are arranged in the same row may be coupled to a source selection line extending in a row direction, and the source selection transistors of the cell strings that are arranged in different rows may be coupled to different source selection lines. In the drawing, the source selection transistor of the cell string CS1<1:m> in a first row may be coupled to a first source selection line SSL1. Further, the source selection transistor of the cell string CS2<1:m> of the second row may be coupled to a second source selection line SSL2.

According to another embodiment of the present disclosure, the source selection transistors of the cell strings CS1<1:m> and CS2<1:m> may be commonly coupled to one source selection line, unlike those shown in the drawing.

The first to nth memory cells MC<1:n> included in each of the cell strings CS<1:2> <1:m> may be coupled between a source selection transistor SST and a drain selection transistor DST.

The drain selection transistor DST included in each of the cell strings CS<1:2> <1:m> may be coupled between a corresponding bit line and a memory cell MC<1:n>. Cell strings arranged in the row direction may be coupled to a drain selection line extending in the row direction. The drain selection transistor of the cell string CS1<1:m> of the first row may be coupled to a first drain selection line DSL1. The drain selection transistor of the cell string CS2<1:m> of the second row may be coupled to a second drain selection line DSL2.

Cell strings arranged in a column direction may be coupled to a bit line extending in the column direction. In the drawing, the cell strings CS11' and CS21' of a first column may be coupled to a first bit line BL1. The cell strings CS1*m*' and CS2*m*' of an m-th column may be coupled to the m-th bit line BLm.

Memory cells coupled to a word line in the cell strings that are arranged in the row direction may form one physical page. For example, the memory cells coupled to a first word line WL1 among the cell strings CS1<1:m> of the first row may form one physical page. For another example, the memory cells coupled to the first word line WL1 among the cell strings CS2<1:m> of the second row may form another physical page. Cell strings arranged in one row direction may be selected by selecting one of the drain selection lines DSL1 and DSL2. One physical page among the selected cell strings may be selected by selecting one of the word lines WL<1:n>.

According to an embodiment of the present disclosure, at least one of the first to nth memory cells MC<1:n> may be used as a dummy memory cell. For example, the at least one or more dummy memory cells may be provided to reduce an electric field between the source selection transistor SST and the memory cell MC<1:n>. Further, the at least one or more dummy memory cells may be provided to reduce an electric field between the drain selection transistor DST and the memory cell MC<1:n>. As more dummy memory cells are provided, the size of a memory block may be increased while the operation reliability of the memory block is improved. As less memory cells are provided, the operation reliability of the memory block may be deteriorated while the size of the memory block is decreased.

In order to efficiently control the at least one or more dummy memory cells, each of the dummy memory cells may have a required threshold voltage. Program operations may be performed on all or some of the dummy memory cells before or after an erase operation on the memory block. When an erase operation is performed after a program operation, each of the dummy memory cells may have a required threshold voltage by controlling the voltage applied to a dummy word line that is coupled to the dummy memory cells.

The controller 202 may control a program operation of programming data in a selected region of the memory cell array 201. The controller 202 may perform a program operation on the selected memory cells (referred to as 'selected cells') that are coupled between a word line (referred to as a 'selected word line') that is selected as a program target among a plurality of word lines WL<1:n>, a plurality of bit lines BL<1:m>, and a selected string (referred to as a 'selected string') that is selected among the memory cell strings CS<1:2> <1:m>. Herein, the selected cells may have one program state among a plurality of program states through a program operation.

According to an embodiment of the present disclosure, a single level cell SLC in which one data bit is stored may have two program states that are distinguished based on one threshold voltage level. A multi-level cell MLC in which two data bits are stored may have four program states that are distinguished based on three threshold voltage levels. A triple level cell TLC in which three data bits are stored may have eight program states that are distinguished based on seven threshold voltage levels. A quad level cell QLC in which four data bits are stored may have 16 program states that are distinguished based on 15 threshold voltage levels.

Referring to FIG. 2 together with FIG. 1, a program operation may include multiple program loops PL1 to PL7. The controller 202 may program the program cells to have one program state among a plurality of program states (see operation 10 in FIG. 1) by performing multiple program loops PL1 to PL7 one by one in a predetermined order until the program operation is completed. Herein, if the program operation does not succeed within a predetermined number of program loops, the controller 202 may determine the program operation to be a failure.

According to the embodiment of the present disclosure, in FIG. 2, the program operation is successfully performed at a moment when the seventh program loop PL7 among the program loops PL1 to PL7 is completed. In FIG. 2, the program cells have a target program state at a moment when the seventh program loop PL7 among the program loops PL1 to PL7 is completed.

In this case, each of the program loops PL1 to PL7 may include a voltage application operation VIO of changing the threshold voltage levels of selected cells by applying each of the program voltages PGM<1:7> to a selected word line, a word line holding operation HD for preventing a difference between the levels of the word lines WL<1:n> from being increased, and a verification operation VER of verifying a program state of the selected cells by applying each of verification voltages VRY<1:7> corresponding to a target level to the selected word line.

Whenever each of the program loops PL1 to PL7 is performed, the potential level of the program pulse may increase. The program operation may increase the level of the program voltage according to the Increment Step Pulse Program (ISPP) method as each of the program loops PL1 to PL7 is performed. In this case, the number of times that the program voltage used in each of the program loops PL1 to PL7 is applied, the level of the program voltage, and the length of the time that the program voltage is applied may be determined in diverse forms.

Furthermore, the controller 202 may classify word lines (hereinafter referred to as "unselected word lines") that have not been selected as a program target, among the word lines WL<1:n>, into first word lines having a program state and second word lines having an erase state (see operation 20 in FIG. 1). That is, the controller 202 may classify the unselected word line into the first word lines and the second word lines based on a set programming sequence of the word lines WL<1:n>.

According to an embodiment, the controller 202 may perform a programming operation on the word lines WL<1:n> according to a sequence that is started from the 1st word line WL1 and that is terminated in the n-th word line WLn. In one example, it is to be noted that programming may be performed on one word line at a time. Accordingly, in such an example, a programming operation may be performed in a way that memory cells that are connected to the 1st word line WL1 are fully programmed to have desired programming states and then memory cells that are connected to the 2nd word line WL2 are fully programmed to have desired programming states. In such a sequence, if the 10th word line is selected as a selected word line, the controller 202 may classify, as the first word lines, the 1st to 9th word lines having a state in which a program for the 1st to 9th word lines has been completed, and may classify, as the second word lines, the 11th to n-th word lines having an erase state in which a program for the 11th to n-th word lines has not yet been started.

According to another embodiment, the controller 202 may perform a programming operation on the word lines WL<1:n> according to a sequence that is started from the n-th word line WLn and that is terminated in the 1st word line WL1. In one example, it is to be noted that programming may be performed on one word line at a time. Accordingly, in such an example, a programming operation may be performed in a way that memory cells that are connected to the n-th word line WLn are fully programmed to have desired programming states and then memory cells that are connected to the n−1-th word line WLn−1 are fully programmed to have desired programming states. In such a sequence, if the 10th word line is selected as a selected word line, the controller 202 may classify, as the first word lines, the n-th to 11th word lines having a state in which a program for the n-th to 11th word lines has been completed, and may classify, as the second word lines, the 9th to 1-th word lines having an erase state in which a program for the Nos. 9th to 1st word lines has not yet been started.

Furthermore, in the word line holding operation HD that is included in each of the program loops PL1 to PL7, the controller 202 may apply a holding voltage HDV to the selected word line, may apply a holding pass voltage HDVP to the first word lines, and may apply the holding pass voltage HDVP to the second word lines (see operation 30 in FIG. 1). In this case, the controller 202 may set the level of the holding voltage HDV to be equal to or higher than the level of the holding pass voltage HDVP.

Furthermore, in the verification operation VER that is included in each of the program loops PL1 to PL7, the controller 202 may apply the verification voltage VRY to the selected word line, may apply a verification pass voltage VRYP to K word lines that belong to the first word lines and the second word lines, and may apply the holding pass voltage HDVP to the remaining word lines that belong to the second word lines except the K word lines (see operation 40 in FIG. 1). In this case, K may be an integer equal to or greater than 0. In this case, the controller 202 may set the level of the holding pass voltage HDVP as a level lower than the level of the verification pass voltage VRYP.

According to an embodiment, when K is 0, in the verification operation VER that is included in each of the program loops PL1 to PL7, the controller 202 may apply the verification voltage VRY to the selected word line, may apply the verification pass voltage VRYP to the first word lines, and may apply the holding pass voltage HDVP to the second word lines. That is, this may mean that when K is set to 0, in the verification operation VER that is included in each of the program loops PL1 to PL7, the holding pass voltage HDVP is applied to the entire second word lines.

According to another embodiment, when K is 1, in the verification operation VER that is included in each of the program loops PL1 to PL7, the controller 202 may apply the verification voltage VRY to the selected word line, may apply the verification pass voltage VRYP to one word line that belongs to the first word lines and the second word lines, and may apply the holding pass voltage HDVP to the remaining word lines that belong to the second word lines except the one word line.

Furthermore, the controller 202 may classify, as K word lines, a set number of word lines that belong to the second word lines and that are physically adjacent to the selected word line. In this case, the terminology "physically adjacent to" the selected word line may mean a state in which a physical word line is not present between a word line and the selected word line. For example, if K is 1 and the 10th word line is selected as the selected word line, a word line that is physically adjacent to the 10th word line may mean the 9th or 11th word line. As another example, if K is 2 and the 10th word line is selected as the selected word line, a word line that is physically adjacent to the 10th word line may mean the 8th and 9th word lines or the 11th and 12th word lines.

For reference, the relation between the levels of the voltages that are used in the word line holding operation HD and the verification operation VER that are included in each of the program loops PL1 to PL7 may be arranged as follows. First, the level of the holding voltage HDV may be a level higher than or equal to the level of the holding pass voltage HDVP. Furthermore, the level of the verification pass voltage VRYP may be a level higher than the level of the holding pass voltage HDVP.

Figure 3:
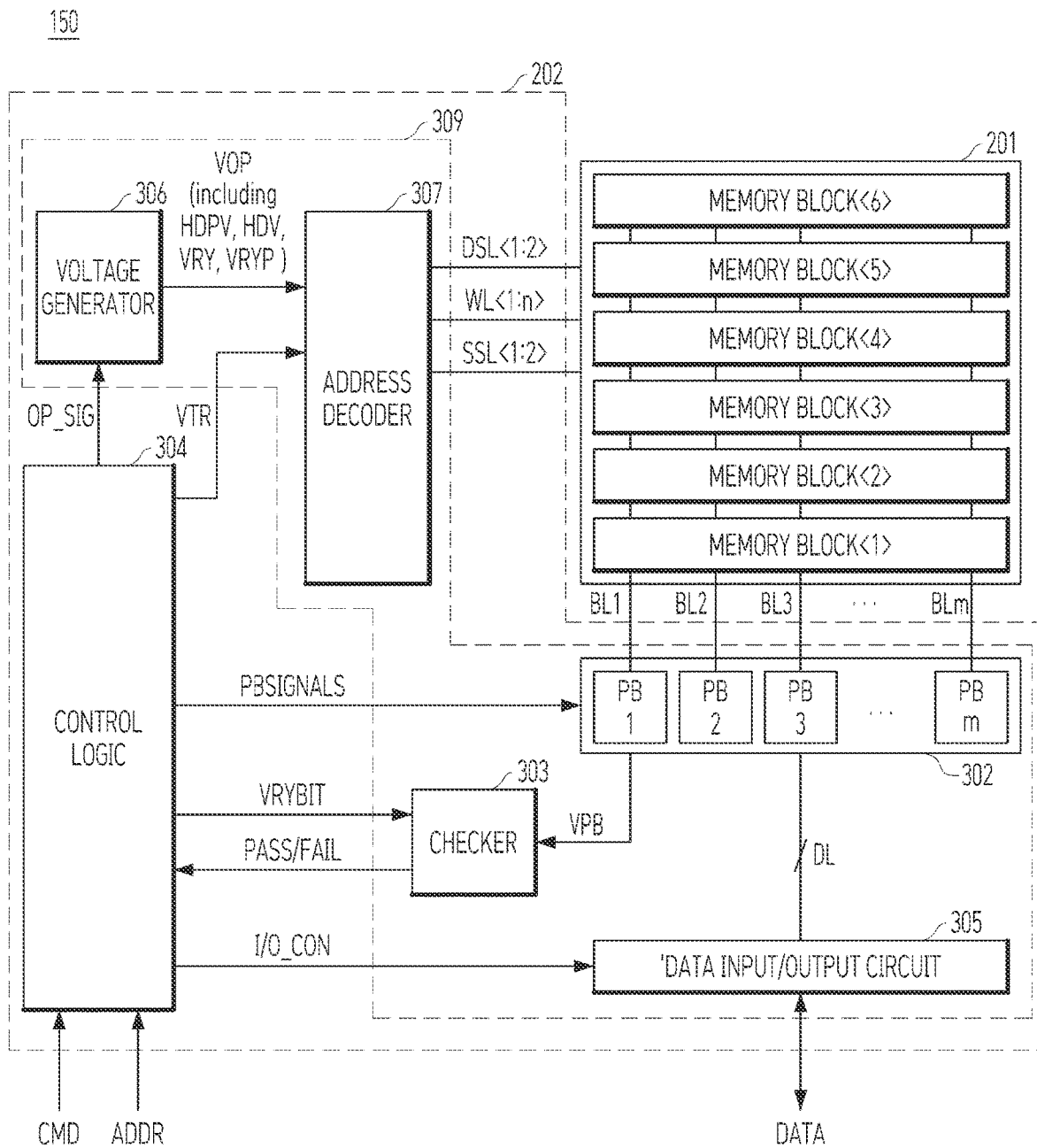
FIG. 3 is a diagram for describing a controller, among the components of the memory device disclosed in FIG. 1 according to an embodiment of the present disclosure.

FIG. 3 is a diagram for describing a controller, among the components of the memory device disclosed in FIG. 1 according to an embodiment of the present disclosure.

Referring to FIG. 3, the memory device 150 may include the memory cell array 201 and the controller 202. The controller 202 may include a control circuit (or peripheral circuit) 309 and a control logic 304. The control circuit may include a page buffer circuit 302, a checker 303, a data input/output circuit 305, a voltage generator 306, and an address decoder 307.

The memory cell array 201 may include a plurality of memory blocks MEMORY BLOCK<1:6>. The memory blocks MEMORY BLOCK<1:6> may be connected to the control circuit 309 through a row line DSL<1:2>, WL<1:n>, SSL<1:2> and bit lines BL1 to BLm. Each of the memory blocks MEMORY BLOCK<1:6> may include a plurality of memory cells. Each of the memory blocks MEMORY BLOCK<1:6> may be formed to have a three-dimensional structure. That is, each of the memory blocks MEMORY BLOCK<1:6> may include a plurality of memory cells that are arranged to have the three-dimensional structure in the +X direction, the +Y direction, and the +Z direction described with reference to FIG. 1.

The row line DSL<1:2>, WL<1:n>, SSL<1:2 may include at least one source selection line SSL1, SSL2, a plurality of word lines (WL<1:n>) and at least one drain selection line (DSL1, DSL2).

The control logic 304 may be connected to the address decoder 307, the voltage generator 306, the page buffer circuit 302, the data input/output circuit 305, and the checker 303 that are included in the control circuit 309.

The control logic unit 304 may control the control circuit 309 by generating several signals in response to the command CMD and the address ADDR. For example, the control logic 304 may generate a generation control signal OP_SIG, a transfer control signal VTR, a read and write control signal PBSIGNALS, a detection reference signal VRYBIT, and an input/output control signal I/O_CON, in response to the command CMD and the address ADDR. The control logic 304 may output the operation signal OP_SIG to the voltage generator 306, may output the transfer control signal VTR to the address decoder 307, may output the read and write control signal PBSIGNALS to the page buffer circuit 302, may output the detection reference signal VRYBIT to the checker 303, and may output the input/output control signal I/O_CON to the data input/output circuit 305. Furthermore, the control logic 304 may determine whether a verification operation or a read operation that is included in a program operation has passed or failed in response to a pass signal PASS or a fail signal FAIL that is output by the checker 303.

The control circuit 309 may be configured to perform a program, read, or erase operation on a selected region of the memory cell array 201. The control circuit 309 may drive the memory cell array 201. For example, the control circuit 309 may apply various operating voltages to the row line DSL<1:2>, WL<1:n>, SSL<1:2> and the bit lines BL1 to BLm, or discharge the applied voltages. The control circuit 309 may perform a program operation on program cells in response to control of the control logic 304. In particular, the control circuit 309 may adjust the level of a voltage that is applied to the row lines DSL<1:2>, WL<1:n>, and SSL<1:2> and the bit lines BL1 to BLm, in response to the transfer control signal VTR that is generated by the control logic 304.

The voltage generator 306 among the control circuit 309 may be configured to generate a plurality of operating voltages Vop by using an external power supply voltage. The voltage generator 306 may operate in response to the control of the control logic 304.

In an embodiment, the voltage generator 306 may regulate the external power supply voltage and generate an internal power supply voltage.

In an embodiment, the voltage generator 306 may generate the plurality of operating voltages Vop by using the external power supply voltage or the internal power supply voltage.

The voltage generator 306 may include a plurality of pumping capacitors, which receive the internal power supply voltage, to generate the plurality of operating voltages Vop having various voltage levels and generate the plurality of operating voltages Vop by selectively activating the plurality of pumping capacitors in response to the control of the control logic 304.

The generated operating voltages Vop may be supplied to the memory cell array 201 by the address decoder 307. For example, the voltage generator 306 may adjust the level and supply time of each of the operation voltages Vop in response to the operation signal OP_SIG.

According to an embodiment, the voltage generator 306 may generate, as an operating voltage VOP, the program voltages PGM<1:7> (refer to FIG. 2), the program pass voltage VPGM, the verification voltage VRY, the verification pass voltage VRYP, the holding voltage HDV, the holding pass voltage HDVP, a read voltage, and an erase voltage, and may supply the generated operating voltage VOP to the address decoder 307. For example, after the start of a program operation, the voltage generator 306 may generate, as the operating voltage VOP, the program voltages PGM<1:7>, the program pass voltage VPGM, the verification voltage VRY, the verification pass voltage VRYP, the holding voltage HDV, and the holding pass voltage HDVP in response to the generation control signal OP_SIG, and may supply the generated operating voltage VOP to the address decoder 307. In this case, the program voltages PGM<1:7> may be voltages that are supplied to a selected word line in the voltage application operation VIO. Furthermore, the program pass voltage VPGM may be a voltage that is supplied to an unselected word line in the voltage application operation VIO. Furthermore, the verification voltage VRY may be a voltage that is supplied to a selected word line in the verification operation VER. Furthermore, the verification pass voltage VRYP may be a voltage that is supplied to K word lines that belong to the first word lines and the second word lines in the verification operation VER. Furthermore, the holding pass voltage HDVP may be a voltage that is supplied to an unselected word line in the word line holding operation HD and that is applied to the remaining word lines that belong to the second word lines except the K word lines in the verification operation VER. Furthermore, the holding voltage HDV may be a voltage that is supplied to a selected word line in the word line holding operation HD. The voltage generator 306 may adjust the time when the operating voltage VOP is supplied in response to the generation control signal OP_SIG. For example, the voltage generator 306 may adjust the time when each of the program voltages PGM<1:7>, the program pass voltage VPGM, the verification voltage VRY, the verification pass voltage VRYP, the holding voltage HDV, and the holding pass voltage HDVP is output in response to the generation control signal OP_SIG, and may output each of the voltages based on the adjusted time.

The address decoder 307 of the control circuit 309 may be connected to the memory cell array 201 through one or more source selection lines SSL<1:2>, the word lines WL<1:n> and one or more drain selection lines DSL<1:2>. Furthermore, the address decoder 307 may be configured to operate in response to the transfer control signal VTR that is generated by the control logic 304. Furthermore, the address decoder 307 may select at least one memory block, among the memory blocks MEMORY BLOCK<1:6>, in response to the transfer control signal VTR that is received from the control logic 304, may classify at least one word line, among word lines that are included in the selected memory block, into a selected word line and an unselected word line, and may classify the unselected word line into the first word lines and the second word lines. Furthermore, the address decoder 307 may transfer one of the holding voltage HDV and the verification voltage VRY to a selected word line in response to the transfer control signal VTR. Furthermore, the address decoder 307 may transfer one of the holding pass voltage HDVP and the verification pass voltage VRYP to K word lines that belong to the first word lines and the second word lines, in response to the transfer control signal VTR. Furthermore, the address decoder 307 may transfer the holding pass voltage HDVP to the remaining word lines that belong to the second word lines except the K word lines, in response to the transfer control signal VTR. Furthermore, the address decoder 307 may transfer a voltage for turning on or off the source selection transistor SST, for example, the source selection voltage VSSL or the ground voltage VSS to the source selection lines SSL<1:2> in response to the transfer control signal VTR. Furthermore, the address decoder 307 may transfer a voltage for turning on or off the drain selection transistor DST, for example, the drain selection voltage VDSL or the ground voltage VSS to the drain selection lines DSL<1:2> in response to the transfer control signal VTR.

The page buffer circuit 302 may include a plurality of page buffers PB1 to PBm. The plurality of page buffers PB1 to PBm may be connected to the memory cell array 201 through the plurality of bit lines BL1 to BLm, respectively. The plurality of page buffers PB1 to PBm may operate in response to the control of the control logic 304.

The plurality of page buffers PB1 to PBm may communicate data DATA with the data input/output circuit 157. During the program operation, the plurality of page buffers PB1 to PBm may receive the data DATA to be stored, through the data input/output circuit 157 and a data line DL.

After the start of a program operation, the a plurality of page buffers PB1 to PBm may store data DATA that is received from the outside through the data input/output circuit 305, and may transmit a program permission voltage or a program inhibition voltage to the bit lines BL1 to BLm in response to the stored data DATA. For example, the program permission voltage may be a ground voltage VSS, and the program inhibition voltage may be a power supply voltage VCORE.

After the start of a read operation, the page buffers PB1 to PBm may sense data DATA based on a voltage or current of the bit lines BL1 to BLm, which is determined based on threshold voltages of the memory cells of a selected page and may transmit the sensed data DATA to the data input/output circuit 305 through the data lines DL.

After the start of an erase operation, the page buffers PB1 to PBm may make the bit lines BL1 to BLm float or may apply a voltage of the ground voltage VSS to the bit lines BL1 to BLm.

The data input/output circuit 305 may include a plurality of input/output buffers (not illustrated) that receive the data DATA inputted thereto. During the program operation, the data input/output circuit 305 may receive the data DATA to be stored from an external. The data input/output circuit 305 may output the data DATA, which is transmitted from the plurality of page buffers PB1 to PBm included in the page buffer circuit 302, to the external during the read operation.

The checker 303 of the control circuit 309 may generate a reference current in response to a verify reference signal VRYBIT that is generated by the control logic 304 after the start of a read operation or a verification operation, may compare a sensing voltage VPB that is received from the page buffer group 123 and a reference voltage that is generated from the reference current, and may output a pass signal PASS or a fail signal FAIL to the control logic 304. For example, when a level of the sensing voltage VPB is higher than or equal to a level of the reference voltage, the checker 303 may output the pass signal PASS to the control logic 304. When the level of the sensing voltage VPB is lower than the level of the reference voltage, the checker 303 may output the fail signal FAIL to the control logic 304.

Figure 4A:
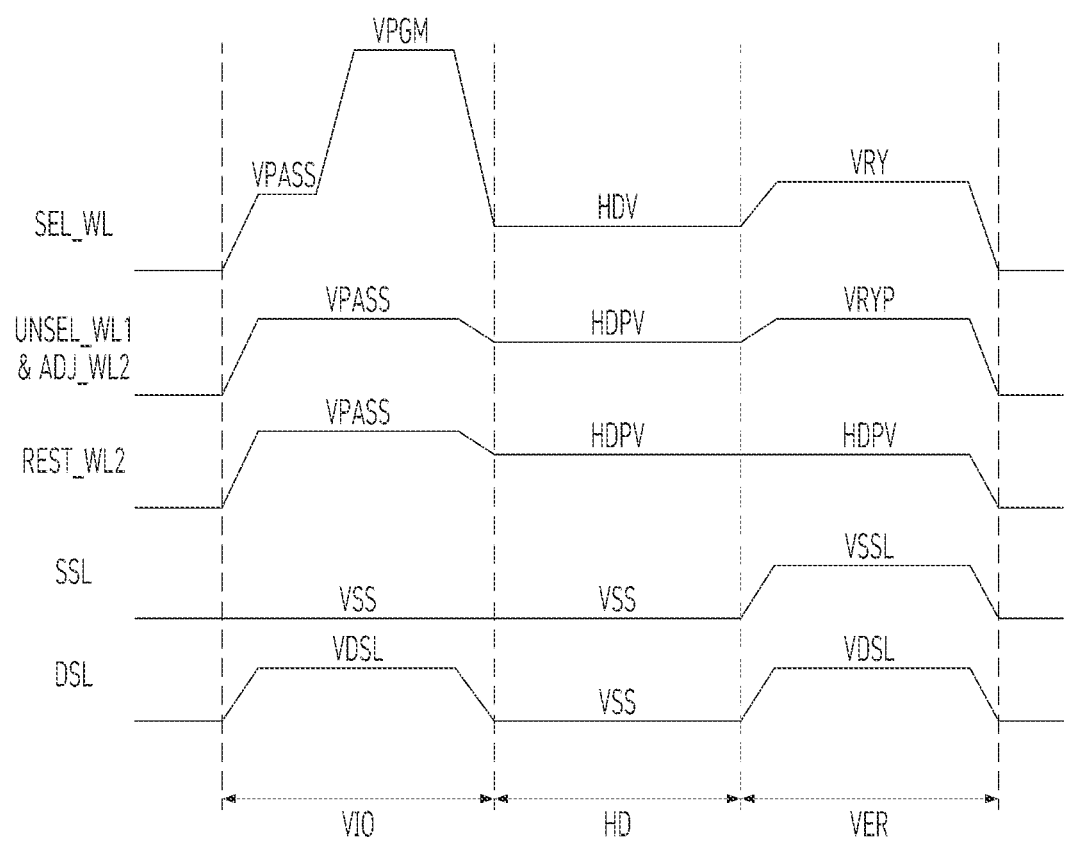

FIGS. 4A to 4C are diagrams for describing a program loop that is included in a program operation of the memory device disclosed in FIGS. 1 and 2 according to an embodiment of the present disclosure.

Referring to FIGS. 1, 2, and 4A to 4C, each of the program loops PL1 to PL7 that are included in a program operation of the semiconductor memory device according to an embodiment of the present disclosure may include the voltage application operation VIO, the word line holding operation HD, and the verification operation VER.

During the voltage application operation VIO, the controller 202 may apply the program voltages PGM<1:7> to a selected word line SEL_WL, may apply the program pass voltage VPGM to unselected word lines UNSEL_WL1 and UNSEL_WL2, may apply the drain selection voltage VDSL to the drain selection line DSL that is connected to the gate of the drain selection transistor DST, and may apply the ground voltage VSS to the source selection line SSL that is connected to the gate of the source selection transistor SST.

Furthermore, in the voltage application operation VIO, the controller 202 may apply one of the power source voltage VCORE and the ground voltage VSS to each of the bit lines BL<1:m>. For example, the controller 202 may apply the ground voltage VSS to a bit line that is connected to a memory cell having a threshold voltage level which has not reached its target level, among the bit lines BL<1:m>. As another example, the controller 202 may apply the power source voltage VCORE to a bit line that is connected to a memory cell having a threshold voltage level which reached its target level, among the bit lines BL<1:m>.

Furthermore, during the word line holding operation HD, the controller 202 may apply the holding voltage HDV to the selected word line SEL_WL and may apply the holding pass voltage HDVP to the unselected word lines UNSEL_WL1 and UNSEL_WL2. Furthermore, during the word line holding operation HD, the controller 202 may apply the ground voltage VSS to the source selection line SSL and the drain selection line DSL.

In this case, the controller 202 may set the level of the holding voltage HDV as a level equal to or higher than the level of the holding pass voltage HDVP.

Furthermore, during the verification operation VER, the controller 202 may apply the verification voltage VRY to the selected word line SEL_WL.

Furthermore, during the verification operation VER, the controller 202 may apply the verification pass voltage VRYP to K word lines ADJ_WL2 that belong to the first word lines UNSEL_WL1 and the second word lines UNSEL_WL2, among the unselected word lines UNSEL_WL1 and UNSEL_WL2. That is, the controller 202 may apply the holding pass voltage HDVP to the first word lines UNSEL_WL1 and the K word lines ADJ_WL2 during the word line holding operation HD, and may apply, to the first word lines UNSEL_WL1 and the K word lines ADJ_WL2, the verification pass voltage VRYP having a higher level than the holding pass voltage HDVP in the verification operation VER subsequent to the word line holding operation HD.

Furthermore, during the verification operation VER, the controller 202 may apply the holding pass voltage HDVP to the remaining word lines REST_WL2 except the K word lines ADJ_WL2 that belong to the second word lines UNSEL_WL2, among the unselected word lines UNSEL_WL1 and UNSEL_WL2. That is, the controller 202 may apply the holding pass voltage HDVP to the remaining word lines REST_WL2 during the word line holding operation HD, and may apply the holding pass voltage HDVP to the remaining word lines REST_WL2 even in the verification operation VER subsequent to the word line holding operation HD.

As described above, the controller 202 may change the levels of some word lines UNSEL_WL1 and ADJ_WL2, among the unselected word lines UNSEL_WL1 and UNSEL_WL2, that is, may change the level of the holding pass voltage HDVP to the level of the verification pass voltage VRYP between the word line holding operation HD and the verification operation VER. In contrast, the controller 202 may maintain the levels of the remaining word lines REST_WL2 except the word lines UNSEL_WL1 and ADJ_WL2, among the unselected word lines UNSEL_WL1 and UNSEL_WL2, that is, may maintain the level of the holding pass voltage HDVP between the word line holding operation HD and the verification operation VER.

Furthermore, during the verification operation VER, the controller 202 may apply the source selection voltage VSSL to the source selection line SSL, may apply the drain selection voltage VDSL to the drain selection line DSL, and may turn on the source selection transistor SST and the drain selection transistor DST. Accordingly, the program state of selected cells that are connected to the selected word line SEL_WL may be detected by the page buffer circuit 302 (refer to FIG. 3). During the verification operation VER, the controller 202 may detect whether the threshold voltage level of each of the selected cells is higher than the level of the verification voltage VRY and may determine whether a program for each of the selected cells has been completed based on the results of the detection.

K is an integer equal to or greater than 0. According to an embodiment, when K is 0, all word lines that belong to the second word lines UNSEL_WL2 may be classified as the remaining word lines REST_WL2. That is, as illustrated in FIG. 4B, all 1st to i−1-th word lines WL<1:i−1> that belong to the second word lines UNSEL_WL2 and that are disposed below the i-th word line WLi, that is, the selected word line SEL_WL, may be classified as the remaining word lines REST_WL2. Accordingly, in FIG. 4B, in the word line holding operation HD and the verification operation VER, the holding pass voltage HDVP may continue to be applied to all word lines that belong to the second word lines UNSEL_WL2.

According to another embodiment, when K is 1, the second word lines UNSEL_WL2 may be classified as the remaining word lines REST_WL2 except one word line ADJ_WL2 that is physically adjacent to the selected word line SEL_WL. That is, as illustrated in FIG. 4C, among the 1st to i−1-th word lines WL<1:i−1> that belong to the second word lines UNSEL_WL2 and that are disposed below the i-th word line WLi, that is, the selected word line SEL_WL, only the i−1-th word line WLi−1 may be classified as the K word lines ADJ_WL2 that are physically adjacent to the selected word line SEL_WL, and the 1st to i−2-th word lines WL<1:i−2> may be classified as the remaining word lines REST_WL2. Accordingly, in the word line holding operation HD and the verification operation VER, the holding pass voltage HDVP may continue to be applied to the 1st to i−2-th word lines WL<1:i−2> that belong to the second word lines UNSEL_WL2 and that are classified as the remaining word lines REST_WL2. The holding pass voltage HDVP may be applied to the i−1-th word line WLi−1 that is classified as the K word lines ADJ_WL2 in the word line holding operation HD, and the verification pass voltage VRYP may be applied to the i−1-th word line WLi−1 in the verification operation VER.

For reference, it may be seen that FIGS. 4B and 4C have illustrated only the selected string CS11', among the cell strings CS11' and CS21' illustrated in FIG. 1, and only the 1st bit line BL1, among the bit lines BL<1:m> illustrated in FIG. 1.

Figure 5:
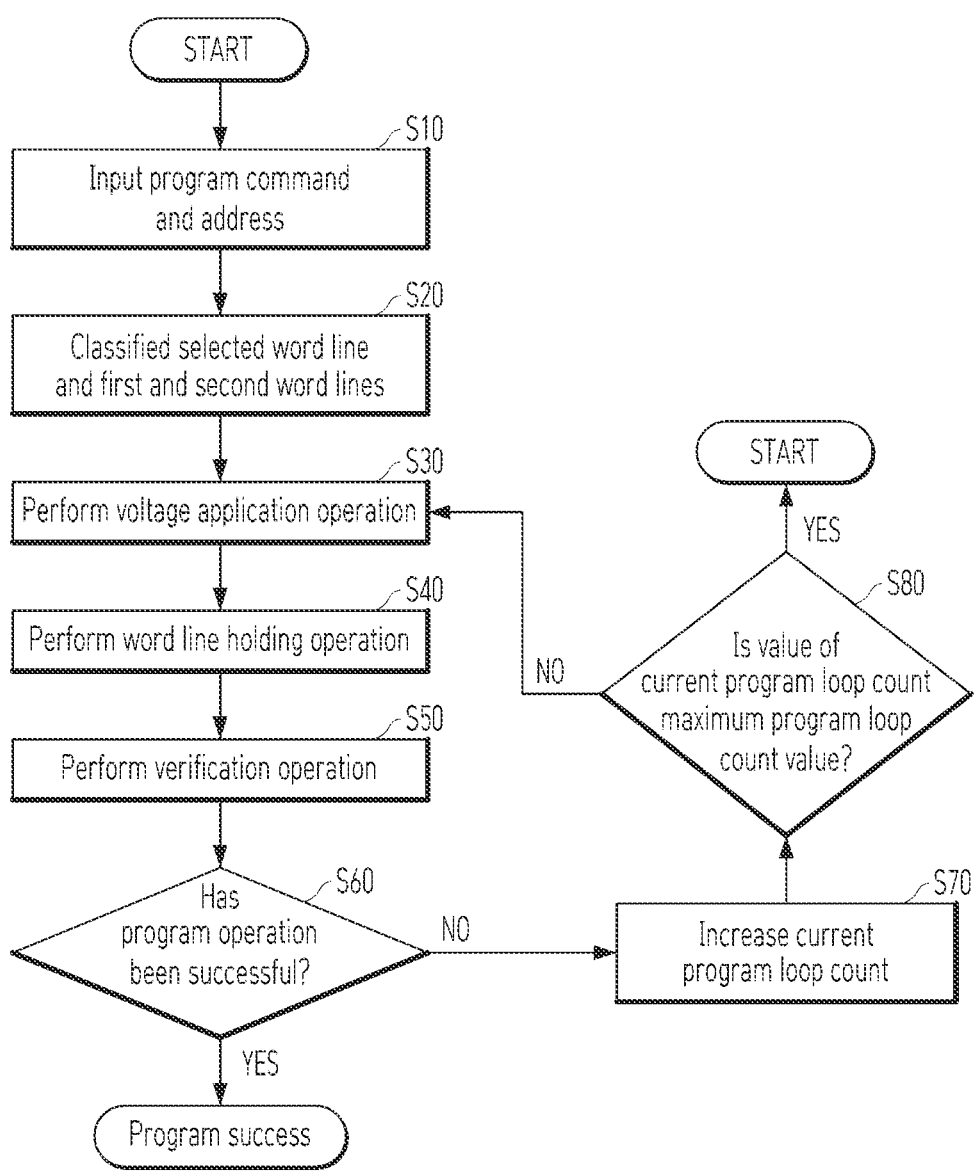
FIG. 5 is a diagram for describing the sequence of a program operation of the memory device disclosed in FIGS. 1 and 2 according to an embodiment of the present disclosure.

FIG. 5 is a diagram for describing the sequence of a program operation of the memory device 150 disclosed in FIGS. 1 and 2 according to an embodiment of the present disclosure.

Referring to FIG. 5, a program command and address may be input to the memory device 150 (at operation S10).

In at operation S10, word lines may be classified into a selected word line and an unselected word line in response to the input of the program command and address. Furthermore, the unselected word line may be classified into the first word lines having the program state and the second word lines having the erase state (at operation S20).

At operation S30, the voltage application operation VIO that is included in the first program loop PL1, among the program loops PL1 to PL7 that are included in the program operation, may be performed.

At the operation S40, the word line word line holding operation HD that is included in the first program loop PL1 may be performed.

At operation S50, the verification operation VER that is included in the first program loop PL1 may be performed.

A detailed operation of each of the operations S20 to S50 has been described with reference to FIGS. 1 to 4A to 4C and may not be further described.

At operation S60, whether the program operation is successful may be checked. When the program operation is successful (i.e., in case of YES in the operation S60), the program operation may be determined to be successful, and may be terminated. When the program operation is not successful (i.e., in case of NO in the operation S60), a current program loop count may be increased (at operation S70). In this case, when the program operation for the first program loop PL1 is not successful, in the operation S70, the value of the current program loop count may be increased from the first program loop PL1 to the second program loop PL2.

At operation S80, whether the value of the current program loop count is a maximum program loop count value may be checked.

When the value of the current program loop count is the maximum program loop count value (i.e., in case of YES in the operation S80), the program operation may be determined to have failed and may be then terminated.

When the value of the current program loop count is not the maximum program loop count value (i.e., in case of NO in the operation S80), the operations S30 to S80 may be sequentially performed on a current program loop, for example, the second program loop PL2 again.

It will be evident to a person having ordinary knowledge in the art to which the present disclosure pertains that the present disclosure described above is not limited by the aforementioned embodiments and the accompanying drawings and that the present disclosure may be substituted, modified, and changed in various ways without departing from the technical spirit of the present disclosure. Furthermore, the embodiments may be combined to form additional embodiments.

What is claimed is:

1. A memory device comprising:
    a memory cell array comprising a plurality of cell strings that are connected between a plurality of bit lines and a common source line and a plurality of word lines that are connected to the plurality of cell strings; and
    a controller configured to
        perform program loops each comprising a voltage application operation, a word line holding operation, and a verification operation until a program operation for selected memory cells corresponding to a selected word line and a selected cell string is successful,
        during the word line holding operation, apply a holding pass voltage having a higher level than a ground voltage to each of first word lines having a program state and second word lines having an erase state, which belong to unselected word lines among the plurality of word lines,
        during the verification operation, apply a verification pass voltage having a higher level than the holding pass voltage to K word lines that belong to the first word lines and the second word lines, and apply the holding pass voltage to remaining word lines except the K word lines, among the second word lines,
    wherein K is an integer equal to or greater than 0.

2. The memory device of claim 1, wherein the controller is configured to
    apply, during the word line holding operation, a holding voltage having a level equal to or higher than a holding pass voltage to the selected word line, and
    apply, during the verification operation, a verification voltage to the selected word line.

3. The memory device of claim 1, wherein the controller is configured to classify the unselected word line into the first word lines and the second word lines based on a set word line programming sequence.

4. The memory device of claim 1, wherein the controller is configured to classify, as the K word lines, a set number of word lines that belong to the second word lines and that are physically adjacent to the selected word line.

5. The memory device of claim 2, wherein the controller comprises:
    a voltage generator configured to generate the holding pass voltage, the holding voltage, the verification voltage, and the verification pass voltage in response to a generation control signal;
    an address decoder configured to
        classify the plurality of word lines into the selected word line and the first and second word lines,
        transfer one of the holding voltage and the verification voltage to the selected word line in response to a transfer control signal,
        transfer one of the holding pass voltage and the verification pass voltage to the first word lines and the K word lines, and
        transfer the holding pass voltage to the remaining word lines; and a control logic configured to generate the generation control signal and the transfer control signal in response to an address and command that are externally applied.

6. The memory device of claim 5, wherein, during the word line holding operation, the control logic is configured to set values of the generation control signal and the transfer control signal so that the voltage generator generates the holding pass voltage and the holding voltage, and the address decoder transfers the holding voltage to the selected word line and transfers the holding pass voltage to each of the first and second word lines.

7. The memory device of claim 5, wherein, during the verification operation, the control logic is configured to set values of the generation control signal and the transfer control signal so that the voltage generator generates the holding pass voltage, the verification voltage, and the verification pass voltage, and the address decoder transfers the verification voltage to the selected word line, transfers the verification pass voltage to the first word lines and the K word lines, and transfers the holding pass voltage to the remaining word lines.

8. An operating method of a memory device comprising a plurality of cell strings that are connected between a plurality of bit lines and a common source line and a plurality of word lines that are connected to the plurality of cell strings, the operating method comprising:
  performing program loops each comprising a voltage application operation, a word line holding operation, and a verification operation until a program operation for selected memory cells corresponding to a selected word line and a selected cell string is successful;
  classifying the plurality of word lines into the selected word line and an unselected word line and classifying the unselected word line into first word lines having a program state and second words line having an erase state;
  during the word line holding operation, applying a holding pass voltage to each of the first and second word lines and applying a holding voltage having a level higher than or equal to the holding pass voltage to the selected word line; and
  during the verification operation, applying a verification voltage to the selected word line, applying a verification pass voltage having a level higher than the holding pass voltage to the K word lines that belong to the first word lines and the second word lines, and applying the holding pass voltage to remaining word lines except the K word lines, among the second word lines,
  wherein K is an integer equal to or greater than 0.

9. The operating method of claim 8, wherein the classifying of the unselected word line comprises classifying the unselected word line into the first word lines and the second word lines based on a set word line programming sequence.

10. The operating method of claim 8, further comprising classifying, as the K word lines, a set number of word lines that belong to the second word lines and that are physically adjacent to the selected word line.

* * * * *